Nov. 29, 1960     M. D. BRANE     2,962,642
MOTOR CONTROL FOR STEERING VEHICLE
Filed April 24, 1957
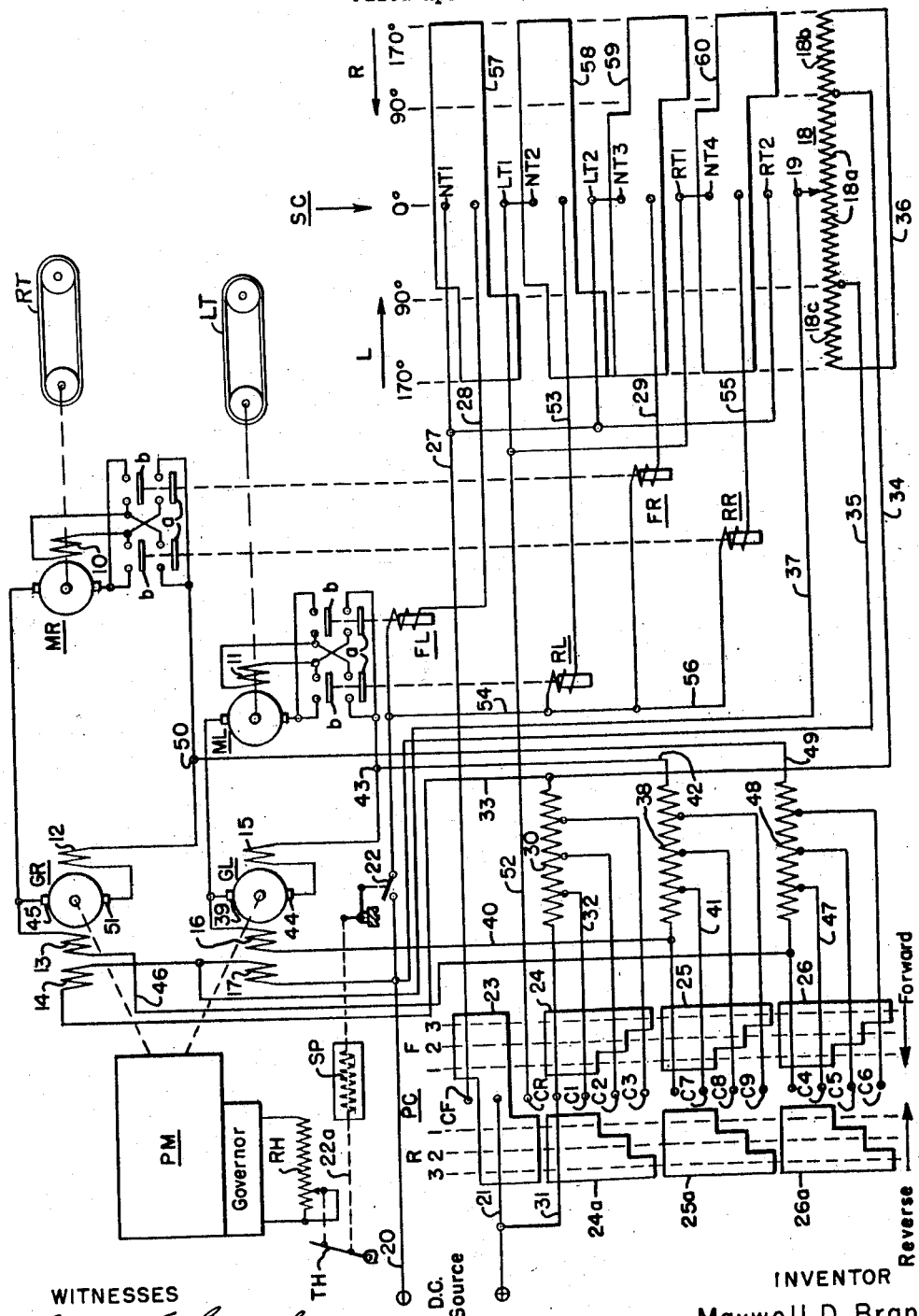
WITNESSES
INVENTOR
Maxwell D. Brane
BY
ATTORNEY United States Patent Office 2,962,642
Patented Nov. 29, 1960

2,962,642
MOTOR CONTROL FOR STEERING VEHICLE

Maxwell D. Brane, Pine Township, Allegheny County, Pa., assignor to Westinghouse Electric Corporation, East Pittsburgh, Pa., a corporation of Pennsylvania Filed Apr. 24, 1957, Ser. No. 654,947

7 Claims. (Cl. 318—55)

This invention relates to an electric vehicle transmission and steering means and more particularly to a control system for providing electric vehicle drive and steering control.

In some previous vehicles employed for handling heavy construction projects, two types of drive and control means have been used. One type involves the use of mechanical transmission for controlling the speed and direction of the vehicle through the use of a transmission with individually operated brakes on each axle of the differential to steer the vehicle by momentarily operating the brake on the proper axle to produce the desired turning action. The other typical system involves an electric power driven vehicle similar to the presently disclosed invention but usually of a very complicated nature. These vehicles, in the past, have required very complicated control systems and sometimes special rotating equipment to obtain the desired results. This type of equipment therefore dictated the use of trained electricians to maintain the equipment.

It is therefore an object of this invention to provide a simple electrical control system similar in function to conventional systems used on large vehicles.

It is another object of this invention to provide a simplified control capable of providing adequate steering through the control of electric drive motors.

It is another object of this invention to provide a steering control capable of gentle definite turns during normal operation.

It is another object of this invention to provide a steering control capable of providing steering controls for extremely short turns when found necessary.

It is another object of this invention to provide a selective control for independent drive motor operation.

It is another object of this invention to provide a common control for simultaneously varying the speed of the vehicle drive motors.

It is another object of this invention to provide a common control for selecting the direction of drive motor rotation.

Other objects, purposes and characteristic features will become obvious as the description of this invention progresses.

The single figure of the drawing shows a diagrammatic representation of the control circuit of this invention.

Similar parts within the drawing bear like reference characters.

The type of vehicle generally provided with a control system of the type to be disclosed in this invention is usually of a common tractor type vehicle provided with two endless tractor treads or driving members, such as the members RT and LT, separately driven by electric motors. The motors for driving the endless tracks or driving members RT and LT will be designated as MR and ML for the right and left motors respectively. Each of the motors MR and ML is provided with a supply generator GR and GL respectively each of which is driven by a prime mover indicated as PM and shown in block form since any suitable prime mover may be used. The drive motor MR is provided with a series field 10 capable of being reversed with relation to the motor MR through the contacts of the forward and reverse relays FR and RR respectively. The drive motor ML likewise includes a series winding 11 capable of being reversed, with respect to the motor ML, by the forward and reverse control relays FL and RL, respectively. The generator GR, used to provide power for the motor MR, is a differential compound machine having a series field 12, a differential shunt field 13 and a separately excited or D.C. control winding 14. Likewise, the generator GL for the motor ML is a compound machine having a series winding 15, a shunt winding 16 and a separately excited or D.C. control winding 17. The differential fields prevent damaging generator currents and the separately excited fields insure voltage-buildup in the proper direction and speed range control.

To provide control for the direction of travel or rotation of the drive motors MR and ML a forward and reverse control PC capable of regulating the speed range of travel as well as the direction of travel is provided. This control can be of the drum type circuit controller and is shown in the drawings as a drum type controller with the strips opened up into a single plane. To provide steering control a second controller SC, which may also be of the drum type of controller is provided. This controller, in addition to making and breaking contacts is also provided with an attached potentiometer 18 for varying the excitation of the generators GR and GL in a manner to be explained hereinafter. It should be pointed out, however, that the potentiometer 18 is movable with respect to the variable tap 19 and in synchronism with the drum of the circuit controller which is represented by movement of strips in a plane as shown in the drawings.

It is believed that a description is best presented by describing a typical operation of the recited parts. If we assume that the conductors 20 and 21 are connected across a suitable direct current source and with the throttle TH and throttle switch 22 open a circuit is held interrupted for the energization of any of the control relays FL, RL, FR, RR. Since, however, the power control PC is in a neutral position as shown in the drawings, these relays are further assured of being deenergized through the interruption of the pick-up circuits by the contacts CF and CR of the power control PC. With the relays FL, RL, FR and RR deenergized, the electrical circuits for the drive motors MR and ML are interrupted causing the vehicle to remain at a standstill. If we assume that the prime mover PM is operating and rotating the generators GR and GL and with the throttle switch 22 open, an operator can now prepare the vehicle for movement in the desired direction at the desired speed range. This is accomplished through rotation of the drum controller PC in the proper direction for the desired direction of vehicle movement. For example, if the operator desires the vehicle to move forward, the drum controller would be rotated to the left as viewed in the drawings, causing the strip 24 to complete the contact C1, the strip 25 to complete the contact C7 and the strip 26 to complete the contact C4. Completion of the contact CF prepares a power circuit from the positive terminal of the D.C. source through the contact CF and into the conductor 27 to the contacts NT1, LT2, NT3, and RT2 of the steering controller SC. With the steering controller in a straight-ahead position, the contact NT1 is completed for a power path to the conductor 28 for the forward relay FL for completing the pick-up for the forward relay FL up to the open throttle switch 22. At the same time, the contact NT3 is completed preparing an energizing circuit over the conductor 29 for the pickup of relay FR up to the throttle switch 22. Closing of the throttle switch 22 completes the two circuits just described and thus completes the energizing circuits for the motors MR and ML for a forward direction of movement of the vehicle. The throttle TH when depressed immediately closes the throttle switch 22 through the link 22a and spring SP at the same time the rheostat RH varies the setting of the prime mover governor to vary the prime mover speed and thus the output of the generators GR and GL. Such a governor control is shown in application Number 535,455, entitled Single Stage Magnetic Amplifier Controlled Electric Governor for Generator Sets Driven by Prime Movers, invented by Frederic P. Emery and Harley A. Perkins, Jr., and assigned to the common assignee.

The contact member 24 when placed in a position to complete the contact C1, as previously described, provides a shunt for a portion of the resistor 30 which causes the battery control windings for the generators GR and GL to increase the flux excitation by lowering the resistance in series with these windings. This circuit can be traced from the positive side of the D.C. source through the conductor 31, the contact member C1, conductor 32, the resistor 30, conductor 33, the winding 14 of the generator GR, the winding 17 of the generator GL and through the conductor 20 to the negative terminal of the source of power. At the same time, the windings 14 and 17 of the generators GR and GL respectively are provided with a resistance shunt in the potentiometer 18 placed in parallel with the windings 14 and 17, the purpose of which will be described hereinafter. This shunt path can be traced from the resistor 30 through the conductor 34, the resistance of the shunt 18 through the conductor 35 to the conductor 20 and the negative terminal of the source of power. It should be pointed out that the path of the current through the shunt resistance 18 is divided through the portion 18a of resistance directly between the taps of the conductor 34 and the conductor 35 and the resistance portions 18b and 18c remaining of the shunt 18 each connected together by the conductor 36. It is also pointed out that the variable tap 19 of the shunt potentiometer 18 is connected through the conductor 37 to a midpoint position between the windings 14 and 17 of the generators GR and GL. The purpose of the variable shunt potentiometer 18 will be described in connection with the steering control described hereinafter.

The contact member 25 of the drum controller PC in completing the contact C7 also shunts a portion of the resistor 38 connected in series with the shunt field 16 of the left-hand generator GL. By shunting a portion of the resistor 38, an increase in shunt field 16, excitation takes place providing an increase in generator power output. This circuit can be traced from the upper terminal 39 of the generator GL through the winding 16 of the generator GL, conductor 40 through the contact member C7, the conductor 41 through the resistor 38, the conductor 42 to the terminal point 43, the series winding 15 and the lower terminal point 44 of the generator GL. The contact strip 26 in completing the contact point C4 likewise increases the flux provided by the shunt field 13 of the generator GR. This circuit can be traced from the terminal point 45 of the generator GR through the shunt field winding 13, the conductor 46, the contact point C4, the conductor 47 through the series resistor 48, conductor 49, junction point 50, the series winding 12 of the generator GR and to the lower contact point 51 of the generator GR. It can be seen the action of the power control PC has been to provide an energizing path for the forward relays FL and FR and also to increase the power output of the generators GR and GL by reducing the series resistance within the circuits of each of the windings 13, 14, 16 and 17.

The relay FL upon becoming energized by the closing of the throttle switch 22 completes the pair of contacts a and b providing a path for the generator current through the motor series winding 11 in one direction and then through the motor ML in one direction. Likewise, the relay contacts a and b of the relay FR also provide for a generator GR power current flow through the motor MR through the contact a of the relay, series winding 10 in one direction, contact b of the relay FR and through the motor armature MR in one direction. With these two relays energized, the motors MR and ML each rotate in the same direction and with the power supply from the generators GR and GL of approximately equal level the rotation of the motors ML and MR is approximately the same. If the operator desires to increase the speed of the vehicle in the same direction, he merely opens the throttle 22 and continues to rotate the controller PC in the previously stated direction causing the contact points C2, C8 and C5 to be contacted by the contact strips 24, 25 and 26, respectively. This causes the shunting of an additional portion of each of the resistors 30, 38 and 48 which in turn again causes an increase in excitation of the generators GR and GL when the throttle switch 22 is again closed in a manner similar to that previously explained. The increased excitation then supplies increased current to the motors MR and ML for faster rotation of these motors. Further rotation of the power controller PC after opening the throttle switch 22 for a still faster speed causes the contact strips 24, 25 and 26 to contact the contact points C3, C9 and C6, respectively, to again reduce the series resistances 30, 38 and 48, again causing greater power output from the generators GR and GL, where the throttle switch is again closed. Additional speed variation is obtained in each power controller PC steps through different throttle TH positions varying prime mover PM output speeds.

If the operator now desires to cause the vehicle to reverse its direction, he merely opens the throttle switch 22, rotates the power control PC in the opposite direction (or reverse direction as indicated on the drawings) to the desired speed level which in turn causes the contact strips 24a, 25a and 26a to gain shunt portions of the resistors 30, 38 and 48 respectively, causing an increase in excitation of the generators GL and GR when the throttle switch 22 is again closed. At the same time, however, the contact strip 23 interrupts the contact CF and closes the contacts CR. Opening of the contacts CF interrupts the pick-up circuits for the relays FL and FR causing these relays to drop out and interrupt the motor control circuits of the motors MR and ML. The closing of the contacts CR however completes a pick-up circuit for the relays RL and RR. This circuit can be traced from the plus terminal of the D.C. source through the contact member CR over the conductor 52 to the contact points LT1, NT2, RT1 and NT4 of the steering controller SC. With the steering controller still in the straight-ahead position, the contact points NT2 become closed energizing the conductor 53, thus completing the circuit for the winding of the relay RL through the conductor 54 and throttle switch 22 to the negative terminal of the source of power. At the same time, the contact point NT4 delivers power to the conductor 55 for energizing the relay winding RR through the conductor 56 and conductor 54 to the throttle 22 and a negative terminal of the source of power. Energization of the relays RL and RR cause the front contacts a and b of each to close and to reverse the flow of current through the motor series windings 10 and 11 with respect to the direction of current through the armature of the motors ML and MR. The circuit for the motor ML can then be traced from the junction point 43 through the front contact a of the relay RL, series winding 11 in the reverse direction, the front contact b of the relay RL and the armature of the motor ML in the same direction as previously described. The same relationship holds true for the circuit of the motor MR. It can be seen, therefore, that the motors ML and MR would rotate in a direction opposite to that previously described and at a speed selected by the operator through the positioning of the contact strips 24a, 25a and 26a under the contact points C1 through C9.

If we assume that the vehicle operator has positioned the power control PC into position capable of providing forward direction of travel and at this time the operator desires to turn the vehicle for example to the right, he would then turn the steering controller SC in the clockwise direction of rotation. From the straight-ahead position to the 90° position no interruption of the energizing circuit for the relays FL and FR occurs. From the 0 to the 90° position steering is accomplished through the movement of the resistor 18 beneath the variable tap 19 in a direction to the left as viewed in the drawings causing the resistance between the variable tap 19 and the conductor 34 to be reduced. This lowered resistance being in parallel with the winding 14 of the generator GR thus causes the excitation on the generator GR to be reduced and in turn causes the motor MR to rotate at a slower speed. This then causes the vehicle to turn to the right. At the same time, the flow of current through the control winding 17 of the generator GL is increased due to the increase of resistance between the tap 19 and the conductor 35 connected to the variable resistance 18. This in turn causes the generator GL to increase its excitation and thus cause the motor ML to rotate even faster than in the straight-ahead direction thus aid in turning the vehicle to the right. If the vehicle turn is not sufficient, the steering control can be turned in the clockwise direction into a zone shown as 90° to 170° position. At this time, a circuit for the FL relay is maintained complete by the contact points NT1 being completed by the strip 57. At the same time, the strip 59 interrupts the contact NT3 causing the FR relay to be deenergized thus stopping the rotation of the motor MR. Also, at the same time, the strip 60 of the circuit controller SC completes the RT2 contact causing the reverse relay RR of the relay MR to be energized. With the reverse relay RR energized the motor MR begins to rotate in the direction opposite to the motor ML. This circuit can be traced from the positive terminal, through contact CF, conductor 27, contact point RT2, contact strip 60, relay RR, conductors 56 and 54, throttle 22 and conductor 20 to the negative terminal of the source. When this occurs, it can be seen that the vehicle will make an abrupt right turn due to the opposite rotation of the motors and their corresponding tracks. The speed of this turn is further adjusted by the variable resistor 18 moving to a point where the tap 19 is located on the resistor portion 18B between the conductors 34 and 36. At this time, the excitation of the control field 14 of generator GR begins to increase and excitation of the control field 17 of generator GL begins to decrease. This then causes the right hand motor to increase its reverse rotation and the left hand motor to reduce its forward rotation.

The same sequence of operation occurs for a turn to the left except that the action is in reverse, that is, in the 0° to 90° turn the left motor is originally slowed down and the right motor is increased in its rotation and then passing the 90° point the left motor reverses the rotation and increases its rotation in the reverse direction while the right motor slows down its rotation in the forward direction.

The 0° to 90° control is accomplished by the relays FR and FL being energized over the contact NT3 and strip 59 and contact NT1 and strip 57, respectively, and the generator excitation variation by the potentiometer 18.

The 90° to 170° control is accomplished by the relay FR remaining energized and the energization of the relay RL in place of the relay FL by the contact LT2 and the strip 58. Again the potentiometer 18 with its tap 19 and resistance portion 18C adds control by excitation changes in the generator fields 14 and 17.

It should be pointed out that if the power controller PC is placed in the reverse direction, a similar sequence of events in the control of the motors ML and MR by the steering controller SC can be expected. For example, if the operator places the power controller in its reverse position and executes a turn to the right while traveling in the reverse direction, with the steering control SC operating in the 0 to 90° range, it can be seen that the relays RL and RR will be energized causing the motors ML and MR to rotate in the reverse direction. The energizing circuit for the relay RL can be traced from the positive terminal of the D.C. source over the contact CR and contact strip 23 through conductor 52, the contact point NT2, conductor strip 58 through conductor 53, the winding of relay RL, conductor 54 and throttle switch 22 to the negative terminal of the D.C. source. The energizing circuit for the relay RR can also be traced from the positive terminal of the D.C. source over the contact point CR, conductor 52, the contact point NT4, conductor 55, relay winding RR, conductors 56 and 54 through the throttle switch 22 and to the negative terminal of the source of power. As previously pointed out, it can be seen that with these two relays energized the motors ML and MR will be rotating in the same reverse direction. With the steering control SC rotated in the clockwise or right hand direction the potentiometer 18 is then moved to the left viewed in the drawing causing the variable tap 19 to reduce the resistance between the conductor 37 and the conductor 34. This results in a reduction of excitation by the winding 14 of the generator GR hence causing the motor MR to turn at a slower rate. At the same time, an increase in resistance occurs between the conductors 37 and 35 due to the relative position of the tap 19 on the potentiometer 18 causing the field winding 17 of the generator GL to increase its flux and thus increase the power delivered to the motor ML by the generator GL. This increase in flux therefore causes the motor ML to rotate at a higher rate therefore providing a turn to the right of a gentle nature.

If the turn to the right is desired to be of a more severe nature the steering controller SC would then be rotated into the 90° to 170° range. At this time the relay RL is maintained energized and the relay RR is deenergized with the relay FR being energized to drive the motor MR for rotation in the forward direction. The circuit for the energization of the relay RL is previously traced and therefore will not be repeated. With the circuit controller rotated past the 90° point, however the contact point NT4 becomes interrupted causing the relay RR to be deenergized. At the same time, however, the contact point RT1 is engaged by the contact strip 59 completing a pick-up circuit through the conductor 29 for the relay FR causing the current to reverse direction in the series winding of the motor MR thus providing for forward rotation of the motor MR. At the same time the variable tap 19 becomes positioned within the portion 18b of the potentiometer causing an increase in excitation of the generator GR and a decrease in excitation of the generator GL. This in turn causes the motor MR to increase its rotation and the motor ML to decrease its rotation. The action of the potentiometer 18 is exactly the same as that previously described in connection with the forward direction of travel therefore will not be discussed further at this time.

If the operator desires to make a turn to the left while traveling in the reverse direction, a rotation of the steering controller SC in a counterclockwise direction is executed. During a turn to the left in the 0° to 90° control by the steering controller SC, the relays RL and RR are energized over the contact NT2 and contact strip 58, and the contact NT4 and the contact strip 60, respectively, and the generator excitation is varied by the potentiometer 18 in a manner similar to that previously described.

The 90° to 170° control is accomplished by the relay RR remaining energized and the energization of the relay FL in place of the relay RL by the contact LT1 and the strip 57. Again the potentiometer 18 with its tap 19 and resistance portion 18C adds motor speed control by excitation changes in the generator fields 14 and 17.

Since numerous changes may be made in the above-described construction and different embodiments of the invention may be made without departing form the spirit and scope thereof, it is intended that all the matter contained in the foregoing description or shown in the accompanying drawings shall be interpreted as illustrative and not in a limiting sense.

I claim as my invention:

1. An electric vehicle power transmission and steering system comprising a plurality of driving members, a plurality of electric motors, with one of said motors being respectively associated with each of said driving members, a first circuit controller for controlling the rate and direction of rotation of all of said motors, and a second controller for selectively controlling the relative rate of rotation of said motors for directing the direction of travel of said vehicle, said second controller having a control portion for at times selectively reversing rotation of one of said motors, and generators for providing electrical power for said electric motors, shunt field windings for said generators, said first controller having a first variable means for controlling the excitation of said windings.

2. An electric vehicle power transmission and steering system comprising a plurality of driving members, a plurality of electric motors, one associated with each of said driving members, a first circuit controller for controlling the rate and direction of rotation of all of said motors, and a second controller for selectively controlling the relative rate of rotation of said motors for directing the direction of travel of said vehicle, said second controller having a control portion for at times selectively reversing rotation of one of said motors, and generators for providing electrical power for said electric motors, shunt field windings for said generators, said first controller having a first variable means for controlling the excitation of said windings, a second variable means for said second controller, said second variable means being capable of effecting the excitation of said field windings with each field winding being differently effected.

3. A vehicle electric motor control system comprising first and second drive motors having field windings, generator means for each of said first and second drive motors, a first circuit controller for controlling said generator means to vary its supply of energy to said drive motors, said drive motors being caused to rotate at a common selected speed and in the same direction by said first circuit controller, a second circuit controller, said second circuit controller causing said generator means to control said motors to rotate at different selected speeds and said motors to rotate in opposite directions.

4. A vehicle electric motor control system comprising first and second drive motors having field windings, generator means for each of said first and second drive motors, a first circuit controller for controlling said generator means to vary its supply of energy to said drive motors, said drive motors being caused to rotate at a common selected speed and in the same direction by said first circuit controller, a second circuit controller, said second circuit controller causing said generator means to control said motors to rotate at different selected speeds and said motors to rotate in opposite directions, said second circuit controller comprising two ranges of control, the first of said two ranges being capable of providing generator means control of said different selected motor speeds, the second of said two ranges being capable of providing said opposite motor rotation as well as generator means control of said different selected motor speeds.

5. A vehicle electric motor control system comprising first and second drive motors having field windings, generator means for each of said first and second drive motors, a first circuit controller for controlling said generator means to vary its supply of energy to said drive motors, said drive motors being caused to rotate at a common selected speed and in the same direction by said first circuit controller, a second circuit controller, said second circuit controller being capable of causing said motors to rotate at different selected speeds and in opposite directions, said second circuit controller comprising two ranges of control, the first of said two ranges being capable of providing said different selected motor speeds through generator means control, the second of said two ranges being capable of providing said opposite motor rotation as well as said generator means control for different selected motor speeds, said generator means comprising two generators provided with selectively variable excitation shunt fields.

6. A vehicle electric motor control system comprising first and second drive motors having field windings, generator means for each of said first and second drive motors, a first circuit controller for controlling said generator means to vary its supply of energy to said drive motors, said drive motors being caused to rotate at a common selected speed and in the same direction by said first circuit controller, a second circuit controller, said second circuit controller causing said generator means to control said motors to rotate at different selected speeds and said motors to rotate in opposite directions, said second circuit controller comprising two ranges of control, the first of said two ranges being capable of providing said different selected motor speeds through generator means control, the second of said two ranges being capable of providing said opposite motor rotation as well as generator control of said different selected motor speeds, said generator means comprising two generators provided with control fields, said control fields being varied in excitation by said second circuit controller during said first and second ranges.

7. A vehicle electric motor control system comprising first and second drive motors having field windings, generators means for each of said first and second drive motors, a first circuit controller for controlling said generator means to vary its supply of energy to said drive motors, said drive motors being caused to rotate at a common selected speed and in the same direction by said first circuit controller, a second circuit controller, said second circuit controller causing said generator means to control said motors to rotate at different selected speeds and said motors to rotate in opposite directions, said second circuit controller comprising two ranges of control, the first of said two ranges being capable of providing said different selected motor speeds through generator means control, the second of said two ranges being capable of providing said opposite motor rotation as well as said generator means control for different selected motor speeds, said generator means comprising two generators provided with control fields, said control fields being varied in excitation by said second circuit controller during said first and second ranges, said second range opposite motor rotation being provided by second controller selective motor field reversing in said second range.

References Cited in the file of this patent

UNITED STATES PATENTS

| | | |
|---|---|---|
| 2,393,618 | Edwards et al. | Jan. 29, 1946 |
| 2,525,472 | Baston | Oct. 10, 1950 |
| 2,565,293 | Aydelott | Aug. 21, 1951 |
| 2,665,402 | Clark | Jan. 5, 1954 |